United States Patent [19]
Dubé

[11] Patent Number: 5,619,522
[45] Date of Patent: Apr. 8, 1997

[54] LASER PUMP CAVITY

[76] Inventor: George Dubé, 342 W. Manor Dr., Chesterfield, Mo. 63017

[21] Appl. No.: 524,593

[22] Filed: Sep. 7, 1995

[51] Int. Cl.$^6$ ........................................ H01S 3/093
[52] U.S. Cl. .................... 372/72; 372/92; 372/34
[58] Field of Search .................. 372/72, 92, 34, 372/6, 66, 75

[56] References Cited

U.S. PATENT DOCUMENTS

| | | |
|---|---|---|
| 3,222,615 | 12/1965 | Holly ........................ 372/66 |
| 3,663,893 | 5/1972 | Ostermayer, Jr. ........... 372/75 |
| 3,821,663 | 6/1974 | Brenner ...................... 372/75 |
| 4,740,983 | 4/1988 | Azad .......................... 32/66 |
| 4,756,002 | 7/1988 | Ruggieri et al. . |
| 4,769,823 | 9/1988 | Dubé . |
| 4,805,177 | 2/1989 | Martin et al. . |
| 4,829,537 | 5/1989 | Baer ............................ 372/92 |
| 4,858,242 | 8/1989 | Kuper et al. . |
| 4,858,243 | 8/1989 | Bar-Joseph . |
| 4,969,155 | 11/1990 | Kahan . |
| 5,140,607 | 8/1992 | Paiva . |
| 5,197,071 | 3/1993 | Yamada ........................ 372/99 |
| 5,317,585 | 5/1994 | Gregor . |
| 5,444,571 | 8/1995 | Debuisschert et al. ....... 372/92 |
| 5,533,163 | 7/1996 | Muendel ..................... 372/6 |

OTHER PUBLICATIONS

Stuart D. Jackson and James A. Piper; Applied Optics; vol. 33, No. 12; Apr. 20, 1994; Theoretical modeling of a diode–pumped Nd:YAG laser with a solid nonfocusing pump light collector; pp. 2273–2282.

*Primary Examiner*—Leon Scott, Jr.
*Attorney, Agent, or Firm*—Polster, Lieder Woodruff & Lucchesi

[57] ABSTRACT

A laser pump includes a pump housing defining a pump cavity. The pump cavity includes reflecting walls having two or more sections, which in combination, encircle the laser element of the laser. The two or more sections have centers which are off-set from each other and which may be of different radii or height. The longitudinal axes of the segments are parallel to the center of the laser element, and the center of one of the segments may be coaxial with the axis of the laser element. Pump light enters the pump cavity through one or more openings in the housing into the cavity and is reflected many times by the reflecting surfaces of the cavity, passing many times in various directions through various parts of the laser element, resulting in efficient and uniform pumping of the laser element.

39 Claims, 6 Drawing Sheets

LASER PUMP CAVITY

BACKGROUND OF THE INVENTION

This invention relates to optical pumps, and in particular, to a more efficient laser pump cavity which will more uniformly and more efficiently illuminate and stimulate a laser element to induce a population inversion in the laser element and an accompanying lasing condition.

One preferred embodiment pertains to the field of optically pumped lasers that use transverse or side pumping to excite a laser element with pump light traveling nominally perpendicularly to the axis of the laser output beam. The present invention relates to a device for redirecting and distributing radiant energy or light from a nominally cylindrical or line source to an object or target. A preferred embodiment is the use of this device as a pumping cavity for a laser. In that application the present invention relates to a device capable when stimulated of having a population inversion established therein and an accompanying lasing condition, and one or more pump sources positioned to pump radiant power into the sides of the lasing medium.

The most common shape of laser elements has been a cylindrical rod. Early dielectric solid state laser rods were transversely pumped by helical flashlamps wrapped around the laser rod. Subsequently linear lamps became widely used. These linear lamps have been positioned colinearly with the laser element and have been incorporated into laser pumping cavities of various designs, including close-wrapped, single elliptical, multiple elliptical, and cylindrical pump cavities. The reflecting walls have been on the inside of cavities or on the outside of transparent materials which, in part, support the laser element in the cavity.

Subsequently lasers and laser diodes began to replace flashlamps as pump sources. The light from a laser diode is more directional than the light from flashlamps, but is typically still highly (i.e. more than 50°) divergent in one direction. Very short focal length lenses are commonly used to reduce the divergence of this light. An advantage of my invention is that the expense and complication of these lenses may be eliminated.

Laser diodes have been used alone or in groups to pump laser materials either longitudinally or transversely. In longitudinal pumping, the pump light travels generally coaxially with the laser beam. In transverse or side pumping, the pump light travels generally perpendicular to the axis of the laser beam. Often a monolithic linear array of laser diode emitters, called a laser diode bar, is used. These linear arrays are typically from three to twenty millimeters in length and may contain several hundred individual emitters. This invention is particularly well suited for use with laser diode bars, as will be described below. Stacks of these laser diode bars have also been used to create two dimensional arrays of laser diodes to pump slabs or larger diameter rods. Complicated reflector shapes have been used to couple the light from two-dimensional laser diode arrays to laser elements. An advantage of this invention is that only simple shapes are required.

More recently upconversion pumping has been employed. In upconversion pumping the pump light wavelength may be longer than the lasing wavelength. Two pumping steps are employed, but in some cases both steps use the same wavelength.

Often it is necessary to actively cool the laser element to remove the heat generated by the absorption of the pump light. It is generally necessary to also provide means for cooling the pump source and the cavity. The cavity structure is heated by absorption of the pump light and conduction from the pump source and laser element. Thus the design of a pumping cavity must consider methods of cooling the laser element, the pumping source and the cavity. Three general laser element cooling techniques have been used. The laser element can be radiatively cooled, immersed in a flowing cooling fluid, or attached to a heat sink which conductively cools the laser element. Unless a transparent heat sink is used, it can be difficult to achieve symmetrical pumping with conductive cooling as the heat sink interferes with the passage of the pumping light. In the case of liquid cooling, the liquid must be nominally transparent to the pumping light and not subject to severe photodegradation from the pumping light.

The efficiency and maximum power of many higher gain lasers may be improved by stifling parasitic oscillations and/or amplified spontaneous emission. As will become clear, this invention provides convenient and effective means for such stifling.

It is generally desirable that the pump light be absorbed symmetrically and completely by the laser element to maximize the efficiency of the laser. It may be desirable that the laser element be pumped more intensely along its central axis and with lower power about the periphery or circumference of the laser element. If the laser element does not absorb the pump light symmetrically, the laser element will be heated asymmetrically. This can lead to pump-induced beam steering and distortion of the laser modes. Much of the detailed design and experimental effort of the past has been devoted to developing practical pump cavities that insure efficient and uniform pump irradiation. In the case of laser diode bars, one way of achieving uniform pumping is to place several bars symmetrically around the laser rod. However, each bar must then operate at exactly the same power and wavelength. This has been achieved by controlling the temperature, hence the wavelength, and electrical power of each individual bar. Such individual controls add greatly to the cost and complexity of the laser. These controls are useful as they keep the wavelength of the diodes tuned to the maximum or proper absorption in the laser element. As the wavelength drifts off of the optimum value, the absorption in the laser element is altered. The alteration of absorption is usually a reduction in absorption. This may also reduce the efficiency of the laser. An advantage of this invention is that efficient and uniform pumping may be obtained over a wide range of absorption coefficient values in the laser element.

Great progress has been made in increasing the power available from an individual laser diode bar. As the power per laser diode bar increases, the number of bars needed to produce a laser of any given power decreases. With fewer bars, it becomes (using presently available pumping cavities) more difficult to achieve symmetric pumping. It is therefore one intent of this invention to make a laser pump cavity that can economically, efficiently and symmetrically pump a laser rod using only one, or a few laser diode bars. As will become clear, this invention will also work with flashlamps and other optical pump sources, as well as with laser elements other than laser rods.

Some lasers require two or more pumping wavelengths The additional wavelengths may be required to depopulate certain energy levels that are detrimental to efficient lasing, to provide the second step in two stage or upconversion lasers, or to provide two or more lasing wavelengths from a single lasing element. As will become clear, this invention is well suited to lasers requiring or benefiting from pump light of two or more wavelengths.

Still another advantage of this invention is that the pump source need not be contained within the reflecting walls of the pump cavity. The source may be external to the pump cavity with the pump light entering the pump cavity through a window or non-reflecting portion of the cavity wall. Thus the laser cavity need not be disturbed when the source must be replaced or adjusted.

SUMMARY OF THE INVENTION

One object of the present invention is to provide a laser pump cavity which will symmetrically irradiate a laser element.

Another object is to provide such a laser pump cavity which may use only one or a few pump sources, or as many pump sources as desired.

Another object is to provide such a laser in which the reflecting surfaces of the pump cavity are not complex in form.

Another object is to provide such a laser pump cavity in which substantially all of the pump light is absorbed by the laser element.

Another object is to provide such a laser pump cavity which will stifle parasitic oscillations, amplified spontaneous emissions, and other noises.

Another object is to provide such a laser pump cavity in which the pump source need not be contained within the cavity.

These and other objects will become apparent to those skilled in the art in light of the following disclosure and accompanying drawings.

This invention teaches the construction and operation of an optical pump for a laser. The laser pump can economically achieve symmetric transverse illumination or pumping of a laser element, even when using only one or a few radiant sources. The pump cavity achieves high efficiency even when single pass absorption is low (due to small diameter laser elements and/or weak absorption coefficients of the laser material for the pump light) by efficiently redirecting the pump light so that it makes several passes through the laser element. At each pass a significant fraction of the pump light is absorbed and converted into laser output. It is one of the advantages of this invention that high efficiency can be obtained even from the transverse pumping of small (<3 mm) diameter, weakly absorbing laser elements. Small diameters are typically used when single transverse mode operation is desired. With small diameter and/or weakly absorbing laser elements, only a small fraction of the pump light is absorbed in any one pass. Thus, to obtain high efficiency, multiple passes must be used. In the case of laser diode pump sources, these multiple passes reduce the requirement that each laser diode emitter be tuned to exactly the correct wavelength for maximum absorption per pass. The elimination of the need for exact tuning via some combination of temperature control and/or electrical current control typically results in a great cost saving and simpler operation over a wider dynamic range of powers.

Briefly stated, a pump housing of the present invention defines a laser pump cavity. A laser element is supported in the pump cavity and surrounded by a cooling element which aids in cooling the laser element. Preferably, the pump housing also operates as a heat sink to aid in cooling the laser element. The pump housing has an inner surface which defines the shape of the pump cavity. The inner surface of the pump housing may be made reflective so that the inner surface of the pump housing operates as a reflective surface of the pump. The cooling element may be a flowing liquid or a solid member. If the cooling element is solid, it is transparent to light which pumps the laser. In such a case, the outer surface of the cooling element may be made reflective to be the reflecting surface of the pump cavity.

The reflective surface includes at least a first section having a longitudinal axis and a second section having a longitudinal axis. In one embodiment, the two sections of the reflective surfaces both define, in cross-section, arcuate segments, and preferably, segments of a circle. The first section longitudinal axis is parallel to and off-set from the second section longitudinal axis. A pump light source is mounted to the pump housing such that the pump light is directed at the reflective surface, the laser element, or both. Preferably, the pump light source is external to the cavity and enters the cavity through a gap in the housing.

In a second embodiment, the reflective surface defines a spiral which may be formed of one or more separate pieces. In another embodiment, the reflective surfaces are planar. In this case, each of the first and second sections are made of at least two portions which form an angle.

The geometrical shape of the reflective surfaces is simple. Further the orientation of the reflective surfaces ensures that only a small fraction of the pump light which enters the cavity will exit the cavity. Thus, virtually all of the pump light will impinge on the laser element to pump the laser element. Further, the geometry of the reflective surfaces and the distribution of the pump source light as it enters the cavity, provide that the pump light will evenly and uniformly pump the laser element, to prevent pump induced steering of the laser element. This is so, even if only one pump source is used.

DETAILED DESCRIPTION OF THE PREFERRED EMBODIMENT

Figure 1:
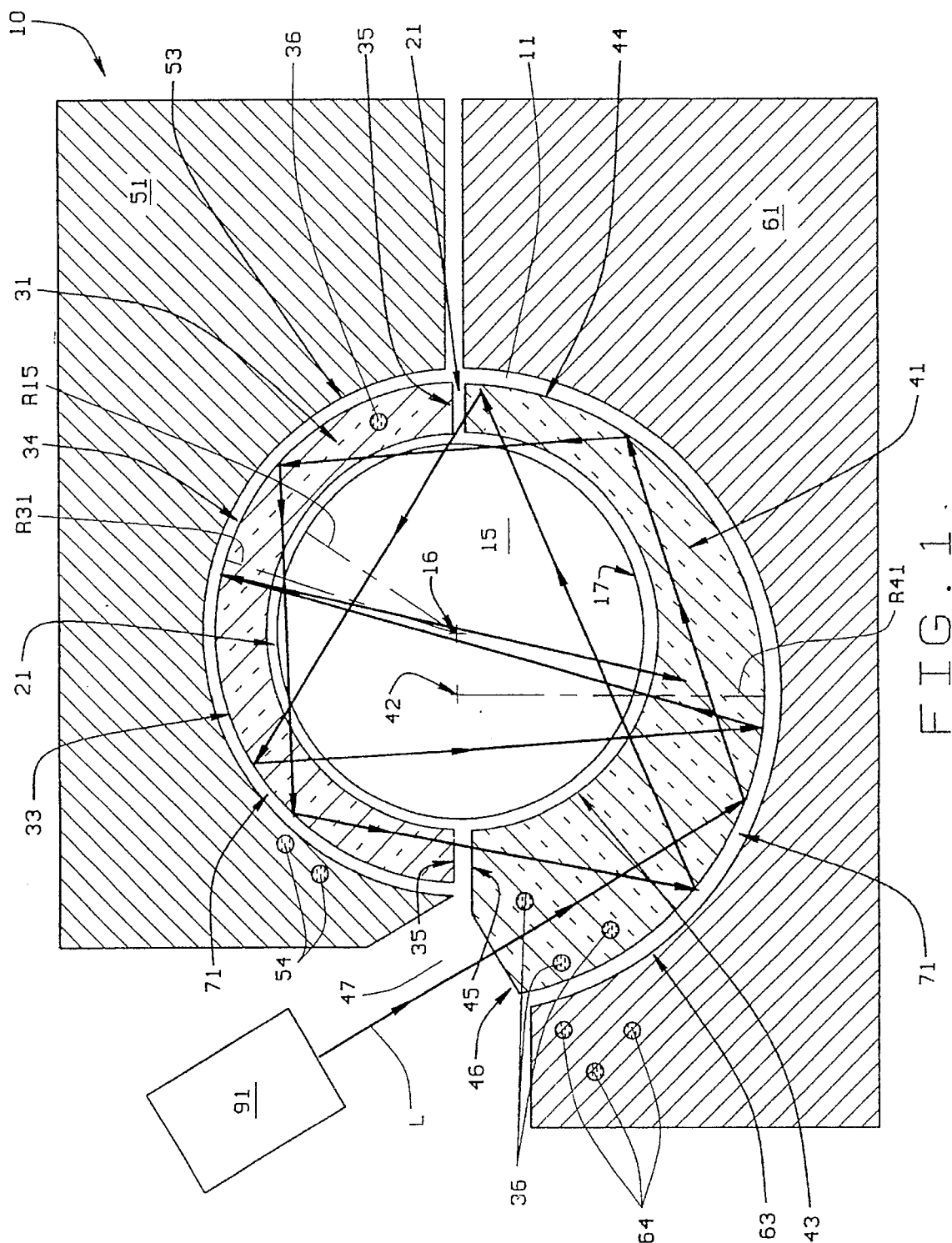
FIG. 1 is a cross-sectional view of one illustrative embodiment of a laser pump cavity of the present invention with conductive cooling of a laser element, showing lines of travel of pump light from a pump source into the pump cavity and laser element.

An illustrative embodiment of a laser pump 10 having a cavity 11 of the present invention is shown in FIG. 1. The pump cavity 11 contains a conductively cooled laser element 15. The laser element 15 is shown to be a laser rod, but it is understood that laser elements of other shapes may be used.. The laser element may be solid or fluid. If the laser element is solid, it may be a Nd-YAG laser element, or any other desired laser element. The laser element is illuminated by pump light emitted from a pump light source 91. The pump light source may be any source of light, including, for example, semiconductor light emitters, laser diode bars, lasers, or flash lamps. If laser diodes are used, they may be arranged in arrays, such as linear arrays. The pump source 91 may be operated to pump continuously or to pulse. It shall be understood throughout this description that the term light includes electromagnetic radiation in the visible, infrared and/or ultraviolet portions of the spectrum. The pump light thus may be a divergent light or a collimated light. The pump light source 91 shown is schematically and may take any configuration. The pump light may be mounted to the pump housing if desired. The pump light, however, is preferably located externally of the cavity, and is situated to direct the light L into the cavity through openings in the housing, as described below.

The axis of the laser element 15 is indicated by 16. The laser element 15 is supported in a pair of sleeves 31 and 41 which are transparent to light L emitted by the pump light source 91 which pumps the laser element 15. Preferably, the sleeves are transparent to the wavelength of light which will pump the laser element and absorbs wavelengths greater than the pumping wavelength to prevent the laser element from lasing along an axis other than its longitudinal axis. The outer surface 17 of laser element 15 is coated with a suitable elastomeric material 21 having a refractive index nominally matching the refractive index of the transparent sleeves 31 and 41. The material 21 may also have adhesive properties. The material 21 has a high thermal conductivity and high transparency to the pump light. The material 21 effectively brings the outer surface 17 of the laser element 15 into contact with the inner surfaces 33 and 43 of the pump cavity sleeves 31 and 41 so that any gap between the laser element 15 and the sleeves 31 and 41 is effectively transparent to the pump light and will not affect the transmission of the pump light L. The material 21 selected for such use should remain relatively pliable to minimize strains on the laser element 15. That is, the material 21 will expand and contract with the laser element 15 so that it will not hinder such thermal expansion. The material 21 used will differ based on the wave length of the pump light used. The material 21 may include, for example epoxy or silicone materials. For ease of disassembly, the material 21 may be softened, melted, or otherwise made flowable upon the application of heat or a solvent. One material that has been successfully used is available under the name Cargille Meltmount from R. P. Cargille Laboratories, Inc. of Cedar Knolls, N.J.

Because the sleeves 31 and 41 have a high thermal conductivity, they serve as a first stage in drawing the heat produced by irradiation of the laser element 15 away from the laser element. The sleeves 31 and 41 may be made of sapphire or yttrium-aluminum-garnet (YAG). However, other materials may be used. In some applications the sleeves may contain internal passages 36 for cooling fluids to further assist in cooling the laser element. The cooling fluid used would also be transparent to the pump light.

It is often advantageous to dope or impregnate the sleeves 31 and 41 with materials that will absorb some of the light emitted by the laser element, while still transmitting the light which pumps the laser element. Such materials help stifle parasitic oscillations and amplified spontaneous emissions. The materials used will vary depending on they type of laser element used. For example, if the laser element is made of YAG doped with trivalent neodymium, YAG doped with trivalent samarium may be used for the sleeves. Other materials, however, may also be used. The sleeves 31 and 41 may, in some applications, also fluoresce so as to increase the pumping of the laser material. If the sleeves fluoresce, the pump source 91 may pump only the sleeves 31 and 41, which in turn will pump the laser element 15. The pump source may also pump only the laser element 15, or both the laser element and the transparent sleeves. If the sleeve and/or the laser element are being pumped, the sleeve is transparent to the wavelength of light which will pump the laser element, but will absorb other wave lengths to reduce parasitic oscillations and amplified spontaneous emissions, or so that the sleeve, if it fluoresces, can be activated to fluoresce. If only the sleeves 31 and 41 are being pumped, and the sleeves fluoresce to pump the laser, the sleeves are not transparent to the wavelength which will pump the laser element.

The lower pump cavity sleeve 41 has an inner surface 43 and an outer surface 44 which define two semi-cylindrical or arcuate surfaces arranged colinearly but not coaxially with each other. The center of surface 44 is at 42, whereas the center of surface 43 is at 16. The centers of the two surfaces are thus off-set from each other. The upper sleeve 31 has inner and outer surfaces 33 and 34, which are shown to be semi-circular. The segments defined by the surfaces of the upper sleeve 31 are coaxial and colinear with each other, as well as with the laser element 15. The sleeve 31 thus has a longitudinal axis of symmetry. The lower sleeve 41 however does not have a longitudinal axis of symmetry. The center of the laser element 15, and the surfaces 33 and 43 are also at 16.

To allow for convenient assembly, each segment is no more than 180° (i.e., semicircular) in cross-sectional extent. Although the surfaces 33, 34, 43, and 44 are shown to be semi-circular (i.e. 180°) in cross-section, segments of other degrees may be used. If segments of less than 180° are used, then there way be more than two sleeves. Although the transparent sleeves 31 and 41, and the outer sleeves 51 and 61 preferably have generally smooth arcuate surfaces, the curvature of the sleeves can be approximated with faceted surfaces without departing from the spirit of my invention. Such faceted surfaces would be made from a plurality of small straight surfaces which would effectively define the curvature of the reflective surfaces of the pump cavity.

The point 42 is the center or axis of the outer surface 44 of the transparent sleeve 41. The outer surface 44 has a radius R41 which is greater than the radius of the laser element. The point 16 is the center of the inner surface 43 of the lower sleeve 41 and the inner surface 33 of the upper transparent sleeve 31. Point 16 is also the center of the laser element 15. The outer surface 34 of the second (symmetric) sleeve 31 has radius R31 which is greater than the radius R15 of the laser element 15, but less than the radius R41 of the outer surface 44 of the sleeve 41. Because the surface 44 is not coaxially aligned with the axis 16 of laser rod 15 or surface 33, the center 42 of surface 44 is off-set from the center 16 of laser element 15 and surfaces 33, 34, and 43. Center 42, however, preferably lies on a diameter of laser element 15 which if extended passes between the gap between the sleeves.

Depending on the nature of the pump source 91, the diameter or transverse dimension of the laser element 15, and other practical considerations, the ratio of the outside radius R41 of the asymmetric transparent sleeve 41 to the radius R15 or transverse dimension of the laser element 15 may vary from 15:1 to 1.2:1. The ratio of the radius R41 of the outer surface of sleeve 41 to the radius R31 of the outer surface of sleeve 31 is preferably between 3:1 and 1:1. The lower ratios are generally more appropriate for laser elements greater than 5 mm in transverse dimension. As stated earlier, the radius R31 of the symmetric transparent sleeve 31 must be between the radius R41 of the asymmetric sleeve 41 and the radius R15 the laser element 15. The outside dimensions of the cooling sleeve may be much larger than shown in the figures to allow for various mounting and cooling fixtures. The gap between the laser element 15 and the upper and lower transparent sleeves 31 and 41 is very small, preferably on the order of thousandths of an inch.

Similarly, the distance or offset between the center 16 of the laser element 15 and the center 42 of the outer surface of the asymmetric transparent sleeve 44 generally varies from 5% to 500% of the laser element diameter or transverse dimension R15, depending on the diameter or transverse dimension of the laser element 15, the nature of the pump source, and other practical fabrication and material considerations. In the case shown in the FIGS. the centers of all curved surfaces lie on a single diameter of the laser element that, if extended, would intersect the gap between the two sleeves 31 and 41. The centers 16 and 42, with reference to FIG. 1 are not vertically offset from each other, rather, they are only offset horizontally from each other. However, the centers could also be vertically off-set from each other.

The outer surfaces 34 and 44 of sleeves 31 and 41 may be coated with a reflective coating to become the reflective surfaces of the pump cavity. Because the centers of the two circular cylinder reflecting surfaces 34 and 44 are not coincident, rays of pump light will, after each reflection, follow a different path through or around the laser material 15. This scrambling of the pump light paths helps to insure uniform and symmetric deposition of the pump light energy in the laser material, especially when the single pass absorption is low. Low single pass absorption will result whenever the laser element transverse dimension is small and/or the absorption coefficient of the laser material for the pump light is low. Only one ray L of pump light is shown in FIG. 1 for purposes of clarity, but it will be apparent to those skilled in the art that much more uniform pumping will result from a fan of rays as is often emitted by common pumping sources. Although the pump light is shown directed at the reflective surface, it could alternatively be directed to initially impinge on the laser element. If a divergent light is used, the light may impinge on both the laser element and the reflective surface. It will also be seen that, although the pump source 91 is external to the pumping cavity 10, the geometry of the reflective surfaces substantially prevent the pump light from exiting. Thus, virtually all of the pump light will be absorbed by the laser element 15.

As noted, the pump light source 91 is preferably external to the pump cavity 11 and the pump light enters the cavity 11 through a gap 47 defined by the outer sleeves 51 and 61. The gap 47 may be one of a plurality of discrete openings into the cavity. It may also be an elongate opening which extends for most of the length of the laser element. The outermost portion of sleeve 41 may be truncated, to define a surface 46 through which the pump light will pass into the cavity 11. The surface 46 need not be flat, as shown, and need not be at the particular angle shown, as many similar arrangements remain within the scope of this invention. The surface 46 should be polished to facilitate the efficient entry of the pump light. Anti-reflective coatings may also be applied to surface 46 to improve the pumping efficiency.

The transparent sleeves 31 and 41 are contained in cooling sleeves or holders 51 and 61. Sleeves 51 and 61 are preferably metallic and have inner surfaces 53 and 63, respectively, which define the cavity 11, and preferably define the shape of the cavity. The sleeves 51 and 61 may be secured to each other to define a housing for the laser pump 10. Springs may be used to compress the cooling sleeves about the transparent sleeves such that the cooling sleeves define the housing. Alternately, the sleeves 51 and 61 may be received within a housing which will maintain the sleeves 51 and 61, as well as the pump light source 91, in their desired relationship.

The sleeves 51 and 61 are in heat transfer relationship with the transparent sleeves 31 and 41 to conduct heat away from the sleeves 31 and 41 and the laser element 15. The pump light source 91 may be mounted directly to one or more of the metallic/cooling sleeves 51 and/or 61. In some applications, the transparent sleeves 31 and 41 will be mounted in the coating sleeves 51 and 61, respectively. The sleeves 51 and 61 facilitate the holding, positioning and cooling of the sleeves 31 and 41. These holders operate as heat sinks and are typically made of a metal having a high thermal conductivity, such as copper or aluminum. They may include internal passages 54 and 64 through which cooling fluids flow to further facilitate cooling of the laser element 15. The cooling of the laser element is made asymmetric by the offset of the transparent sleeves and the gap required to admit the pumping light into the cavity. The cooling sleeves may thus be cooled asymmetrically in order to make the cooling of the laser element more symmetric. In order to reduce stresses caused by temperature gradients, it may be advantageous to firmly attach only one of the transparent sleeves 31 or 41 to its respective cooling sleeve 51 or 61. This will leave the other transparent sleeve in thermal contact with its cooling sleeve, but allow the transparent sleeves 31 and 41 to move slightly with respect to each other. Thermoelectric devices may be used to control the cooling of the laser element to ensure that it is cooled symmetrically.

The outer cylindrical surfaces 34 and 44 of the transparent pump cavity sleeves 31 and 41 or the inner surfaces 53 and 63 of the metallic sleeves 51 and 61 are made specular and/or highly reflective to the pump light to define the reflective surface of the pump cavity. The surfaces are often covered by application of metallic coatings such as gold or silver or by the application of dielectric thin film reflectors designed for high reflectivity of the pump light L. The flat or edge surfaces 35 and 45 of the transparent sleeves 31 and 41, respectively are made highly transparent to the pump light by polishing and/or using the index matching transparent material 21 in the gaps between the flat surfaces 35 and 45 of the sleeves 31 and 41 to join them.

A second suitable adhesive or elastomeric material 71 is used to bond the transparent pump cavity sleeves 31 and 41 to the metallic sleeves 51 and 61. The adhesive 71 has a high thermal conductivity so that the heat of the sleeves 31 and 41 will be passed to the cooling sleeves or holders 51 and 61. If the surfaces 34 and 44 are highly reflective to the pump light, surfaces 34 and 44 define the reflective surfaces of the pump cavity, and the material 71 need not be transparent to the pump light. Material 71 may be the same as the material 21.

If the inner surfaces 53 and 63 of the metallic/cooling sleeves 51 and 61 are made highly reflective, the outer surfaces 34 and 44 of the sleeves 31 and 41 are made transparent to the pump light. If this method is used, the adhesive/elastomeric material 71 used to bond the transparent sleeves 31 and 41 to the metallic sleeves 51 and 61 should be highly transparent to the pump light.

As can be appreciated, the pump source 91 becomes heated during use and may need to be cooled. The pump source may be cooled by the cooling sleeves 51 and 61 (i.e. the cooling sleeves act as a heat sink for the pump source and draw the heat away from the pump source). Alternatively, the pump source 91 may have its own cooling system.

Figure 2:
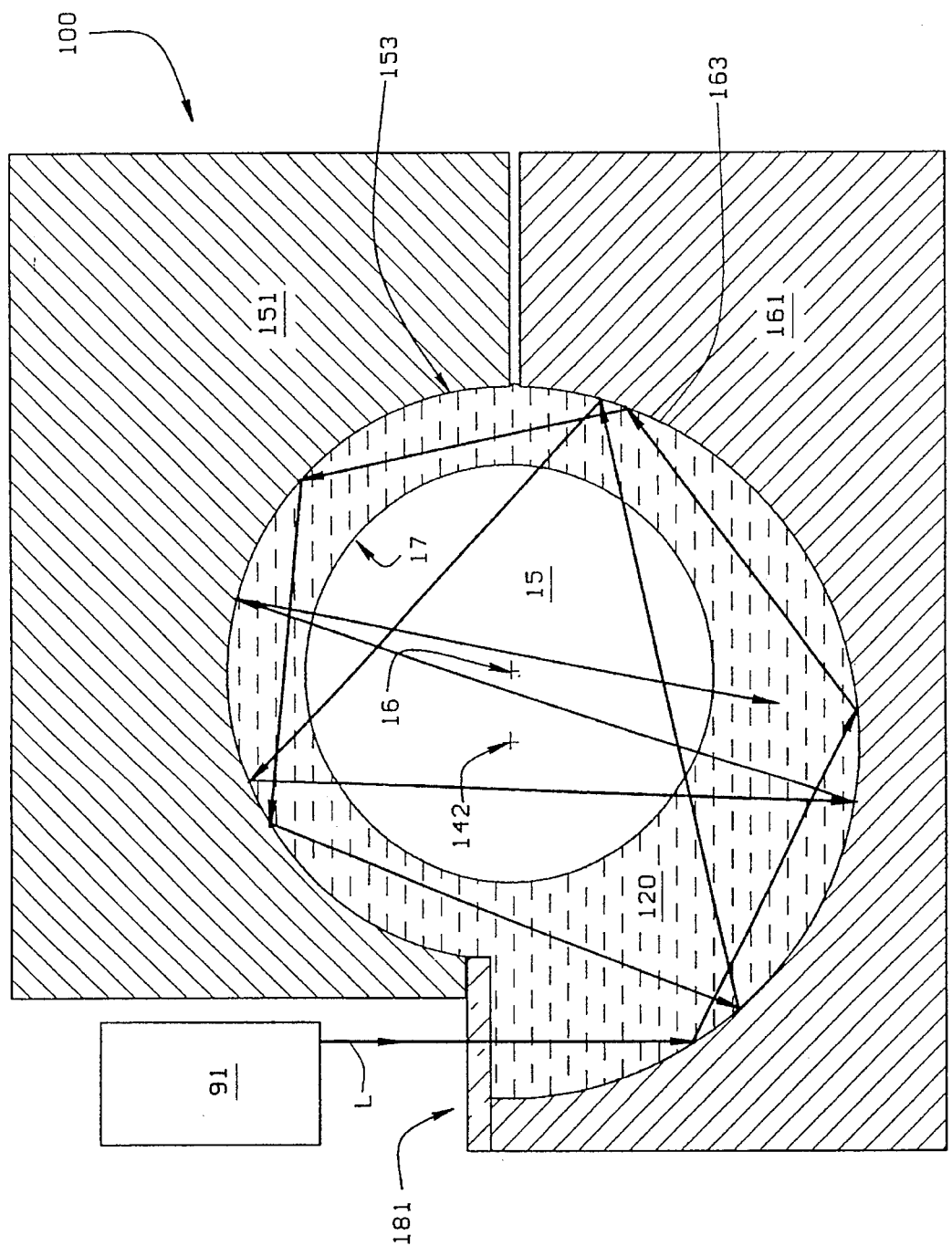
FIG. 2 is a cross-sectional view of a second embodiment of a laser pump cavity of the present invention with fluid or radiative cooling of the laser element, showing lines of travel of pump light from the source into the pump cavity and laser element.

FIG. 2 shows a second embodiment of a laser pump cavity 100 having the fluid cooled laser element 15. The laser element 15 is immersed in a cooling fluid 120 that may be either gaseous or liquid. In the case of radiative cooling of the laser element, the fluid 120 may be subject to a vacuum. In any event, the fluid 120 is transparent to the light which pumps the laser element 15. The laser element 15 and the fluid 120 are contained in at least a pair of sleeves or vessels 151 and 161, which have reflecting inner surfaces 153 and 163, respectively. Because pump cavity 100 does not have the inner sleeves 31 and 41 of pump cavity 10, end plates or caps (not shown), as is known in the art, are required to hold the laser element 15 in the proper relationship to the pump cavity and the inner surfaces of vessels 151 and 161 and to appropriately direct the cooling fluid 120 around the laser element 15. Passages for the entry and exit of the cooling fluid may be created in the end caps and/or the cooling sleeves using techniques well known to those skilled in the art.

The inner surface 163 of lower sleeve 161 is arcuate, and preferably semi-circular, in cross-section. The surface 163 is colinearly, but not coaxially, aligned with the outer or barrel surface 17 of the laser element 15. The center or longitudinal axis 142 of the circle defined by surface 163 is thus off-set from the center or longitudinal axis 16 of the laser element 15. The second or upper vessel 151 has a cylindrical inner surface 153 having a radius greater than the radius of the laser element 15. Unlike the lower vessel 161, the inner surface 153 of the upper vessel 151 is coaxially and colinearly aligned with the axis 16 of the laser element 15. The center or longitudinal axis 142 of the lower reflecting surface 163 is thus also off-set from the center or longitudinal axis 16 of the circle defined by inner surface 153. The shape of the reflecting walls 153 and 163 is similar to the shape of the reflecting walls in pump cavity 10, but the space between the reflecting walls and the laser element 15 is filled with cooling fluid 120 or vacuum rather than a transparent solid and adhesives or elastomeric materials.

A window 181 is provided to contain the cooling fluid 120 or vacuum while admitting the pumping light. Again the offset of the centers 142 and 16 of the two nominally circular cylindrical reflecting surfaces 153 and 163 assures a scrambling of the pump light rays upon each reflection. The inner surfaces 153 and 163 of the sleeves or vessels 151 and 161 are made highly reflective to the pump light by the polishing or smoothing of the surfaces. The surfaces 153 and 163 may additionally be coated with highly reflective metal coatings or dielectric thin films to facilitate in making the surfaces highly reflective to the pump light. The sleeves 151 and 161 may also contain internal channels, such as channels 54 and 64 of sleeves 51 and 61 (FIG. 1), for cooling or otherwise controlling the temperature of fluid 120 so that the laser element 15 will be evenly or symmetrically cooled.

Figure 3:
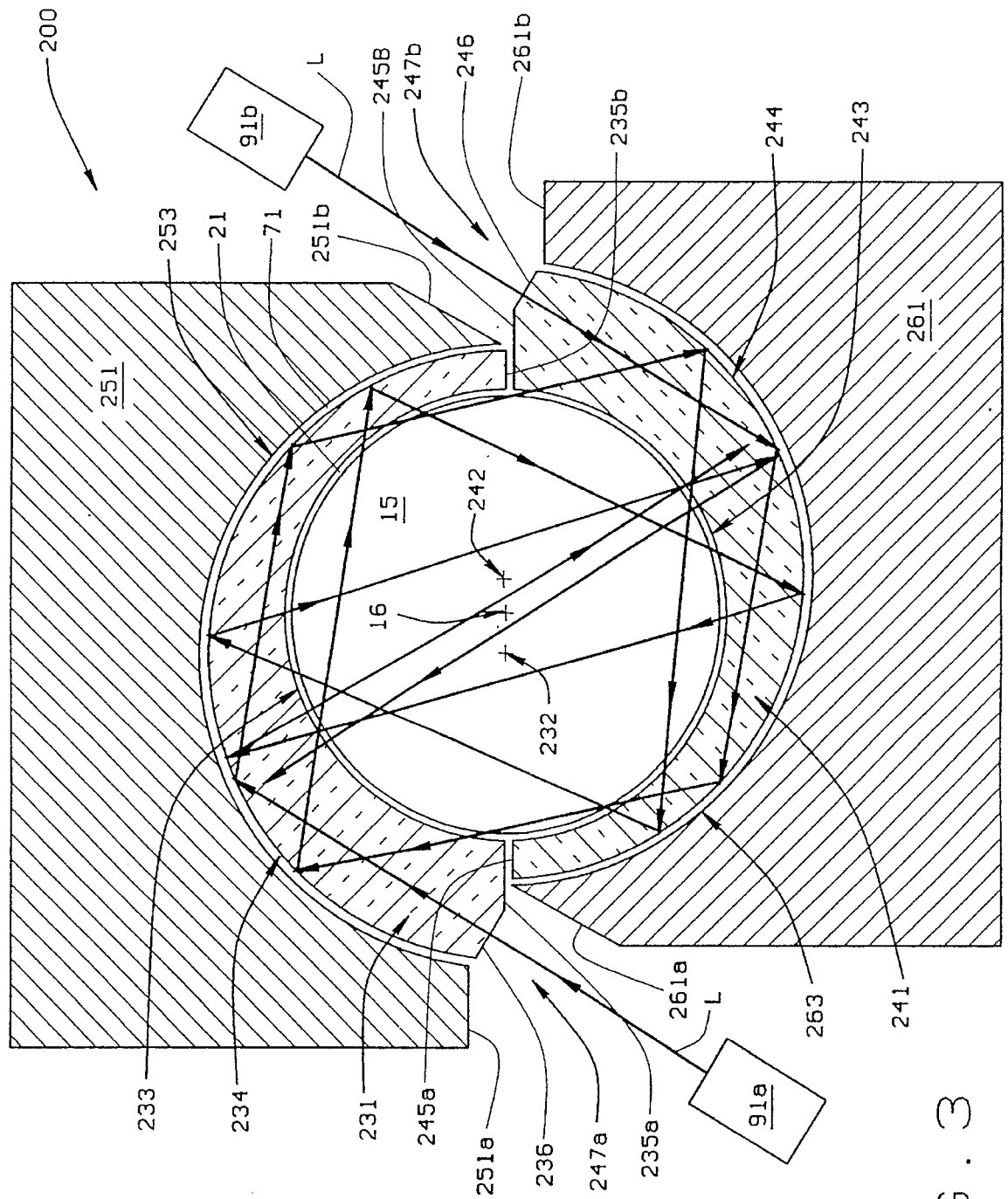
FIG. 3 is a cross-sectional view of a third embodiment of a laser pump cavity of the present invention incorporating two pump sources with conductive cooling of the laser element.

FIG. 3 shows a third embodiment of the pump cavity 200 which uses two pump sources 91. The use of two pump sources 91 can increase the power and uniformity of pumping. The pump cavity 200 is shown to have transparent inner sleeves 231 and 241, somewhat similar to the sleeves 31 and 41 of pump cavity 10, which support the laser element 15. Although the laser is held by the sleeves 231 and 241, it could alternatively be held in a fluid or vacuum, as in pump cavity 100. The inner sleeves have semi-circular inner surfaces 233 and 243, respectively, semi-circular outer surfaces 234 and 244, respectively, and planar mating surfaces 245a, 235a, 235b, and 245b. As can be seen, the inner and outer surfaces of the sleeves define semi-circles of differing radii and are not axially aligned. Thus, each sleeve has a narrower edge 235b and 245a, respectively, and a wider edge 235a and 245b, respectively. The wider edges are shown to be beveled as at 236 and 246, respectively. The beveled surfaces are shown to be normal to the ray of light L which is emitted by the pump sources 91a and 91b. As the light emitted from the pump sources may be divergent, it will be understood that not all the light which enters the cavity will be normal to the beveled surfaces 236 and 246.

The inner sleeves 231 and 241 are contained or supported in outer cooling sleeves 251 and 261. As with pump cavity 10, an adhesive or elastomeric material 21 is used to fasten the inner surfaces 233 and 243 of transparent sleeves 231 and 241 to the laser element 15 and material 71 is used to fasten heat sinks 251 and 261 to the outer surfaces 234 and 244 of the transparent sleeves. This version of the invention has the advantage that twice as many pump sources may now be used and even better uniformity may be achieved.

The outer sleeves or heat sinks 251 and 261 are identical to each other, as are transparent inner sleeves 231 and 241, but are inverted and off-set from each other, as can be seen. The laser element 15 and the inner surfaces 233 and 243 of the transparent sleeves have common centers or longitudinal axes 16. The outer surface 244 of sleeve 241 and the inner surface 263 of heat sink 261 have their centers or longitudinal axes at 242, whereas the outer surface 234 of upper inner sleeve 231 and the inner surface of 253 of upper heat sink 251 have their centers or longitudinal axes at 232. As with pump cavity 10, the outer surfaces 233 and 243 of sleeves 231 and 241 or the inner surfaces 253 and 263 of heat sinks 251 and 261 define the reflective surfaces of the pump cavity. Thus, although the upper and lower reflective surfaces are mirror images of each other, and have the same radius, the upper and lower sleeves are off-set from each other. The centers 232 and 242 of the reflective surfaces are therefore off-set from each other. Thus, the same scrambling of the pump light that is achieved with the reflective surfaces of pump cavities 10 and 100 is achieved in pump cavity 200.

Figure 4:
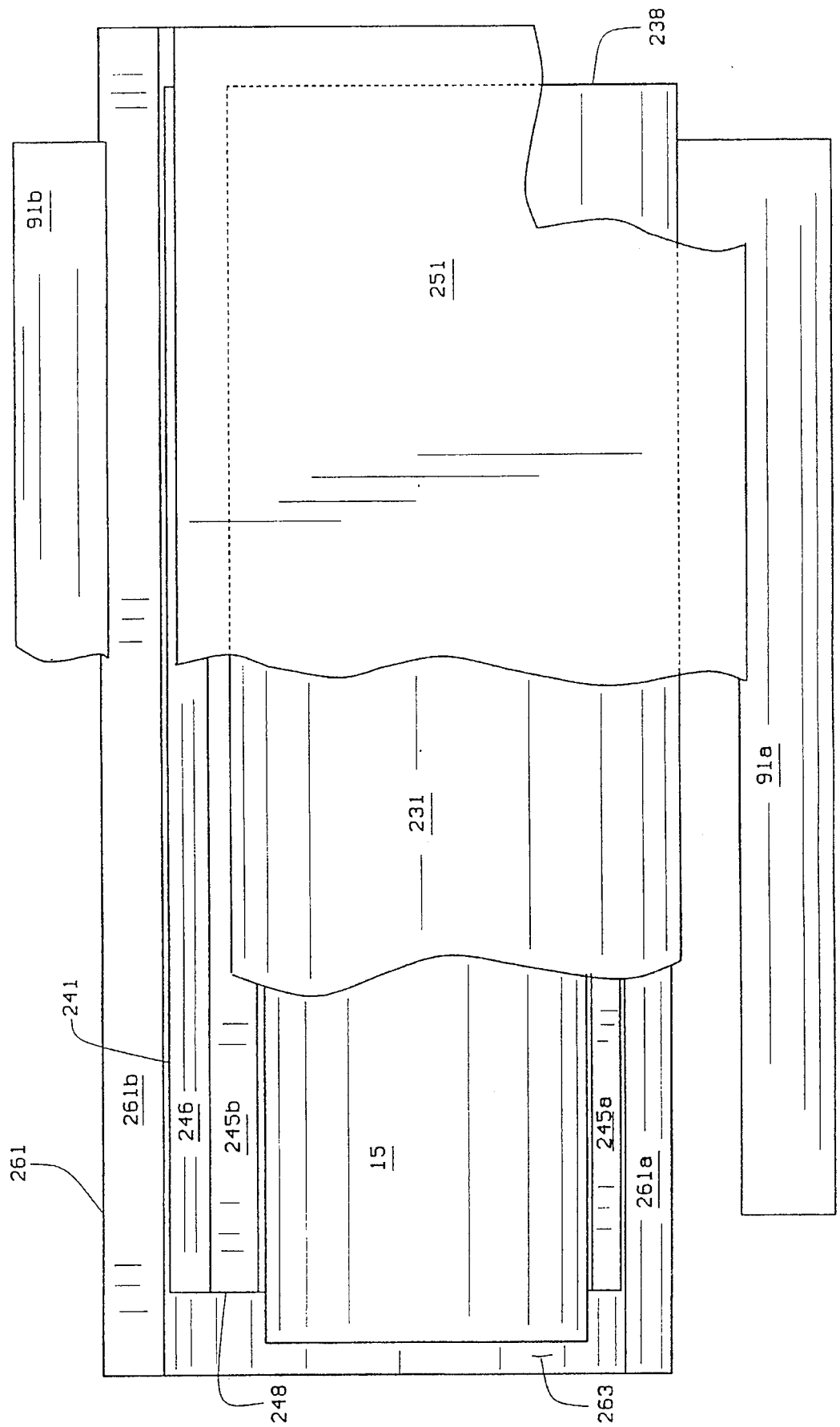
FIG. 4 is a top plan view of the laser pump cavity shown in FIG. 3, cut away to show the elements of the laser pump.

Turning to FIG. 4, it can be seen that the pump sources 91 are generally shorter than the transparent sleeves 231 and 241. This will help ensure that all, or nearly all, of the light emitted from the pump sources 91 enters the pump cavity and is captured by the sleeves 231 and 241. The axial end surfaces 238 and 248 of the sleeves 231 and 241 are preferably made highly reflective (internally) to the pump light, but may be of any reflectivity value without seriously degrading the laser performance. The laser element 15 may be the same length as the transparent sleeves, but is preferably slightly longer than the transparent sleeves 231 and 241. If the laser element is slightly longer than the transparent sleeve, virtually all of the light captured by the sleeves will be incident upon the laser element. The longer laser element also makes it convenient to clean the ends of the laser element. The cooling sleeves 251 and 261 are generally slightly longer than the laser element 15 to protect the laser element from contact with foreign objects. It will be understood that variations in these length and diameter ratios may be preferred in certain situations and will still be within the scope of this invention.

A particular advantage of this invention is that short laser elements may be stacked end-to-end within the conductively cooled cavity. The inner walls of the cavity in the transparent sleeve support the laser element segments in place. This method of construction is useful when only short sections of laser elements are available to allow two or more segments or lengths of laser elements to be used. If two or more laser elements are used, they may be of different materials or orientations, and may lase at the same or different wavelengths. This use of two or more laser segments can aid in compensating for birefringence, distortion, or can offer additional wavelengths.

Figure 5:
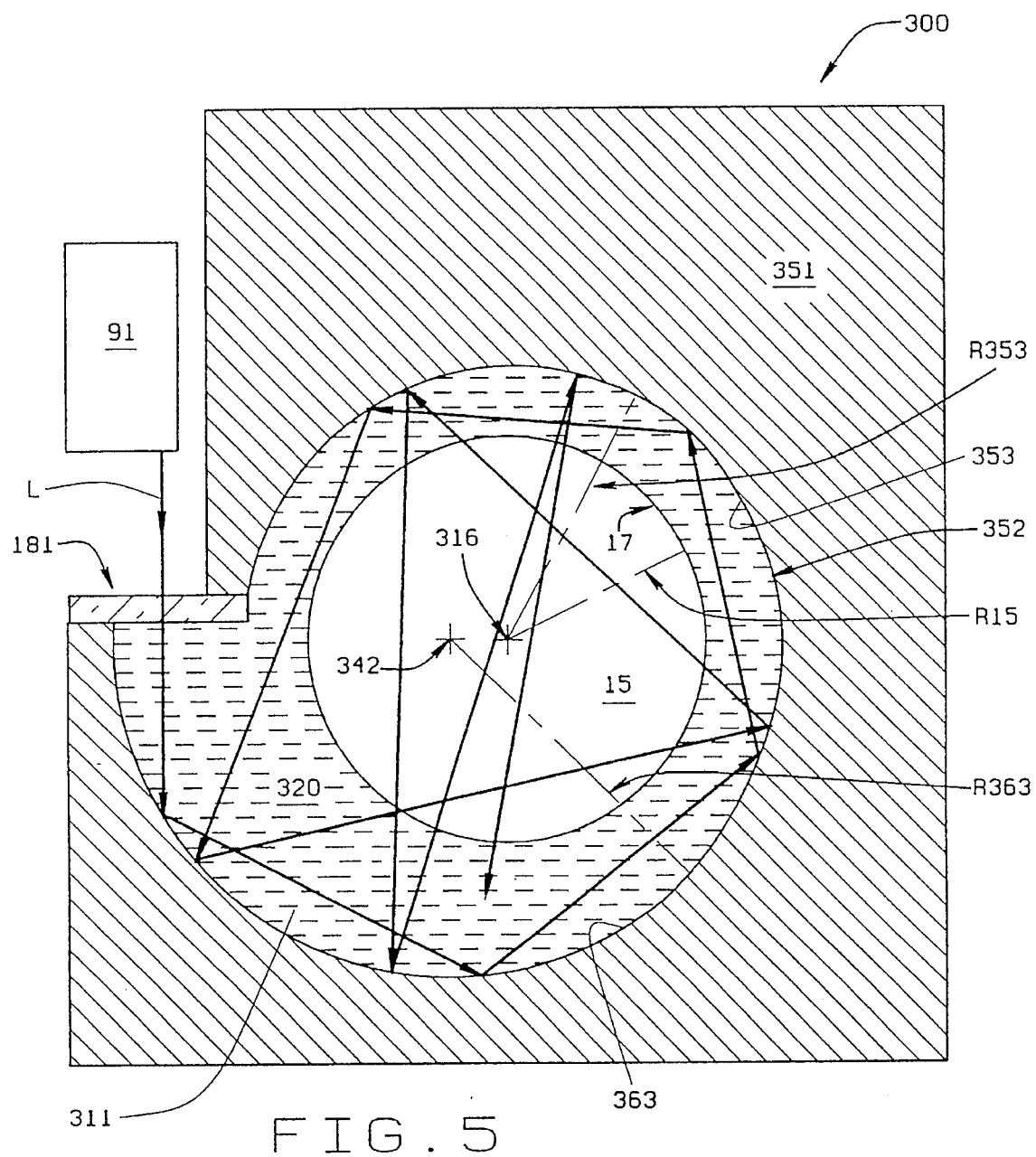
FIG. 5 is a cross-sectional view of a fourth embodiment of a laser pump cavity of the present invention with fluid or radiative cooling of the laser element, wherein the housing is a one-piece housing constructed from a single piece of material.

FIG. 5. shows a fourth embodiment of the laser pump cavity of the present invention. The laser pump 300 has a unitary, one-piece housing 351 defining a cavity 311 which houses laser element 15. Laser element 15 is fixed within cavity 311 in the same way the laser element is fixed in the laser pump 100. The laser element 15 is immersed in a cooling fluid 320 that may be either gaseous or liquid. In the case of radiative cooling of the laser element, the fluid 320 may be subject to a vacuum. In any event fluid 320 is transparent to the pump light. The cavity 311 is defined by a continuous, uninterrupted surface 352 which forms the reflecting surface of the laser pump cavity. The curvature of these reflecting surface 352 may define two nominally semi-cylindrical surfaces, analogous to the reflecting surfaces of embodiments of FIGS. 1 and 2. Alternately, the surface 352 may be define a spiral which can be divided into a lower half 363 and an upper half 353 so that an average radius R363 of section 363 is larger than an average radius R353 of section 353, as shown. The center of the laser element 15 and the nominal center of section 353 is at 316. The nominal center of the lower portion 363 is at 342. The nominal center 342 of section 363 is displaced from the nominal center 316 of section 353. Thus, this embodiment features the design feature characteristic of this invention, i.e., two reflecting surfaces mounted colinearly but not coaxially with each other. This construction could be machined from a solid piece of material or could be extruded or molded. Not shown in this view are end plates or caps, as are known in the art, required to properly position the laser element 15 and to contain and direct the cooling fluid 320 within the pump cavity 311. Because fluid cooling is used, the material of the body 351 need not have high thermal conductivity and need not be metallic.

Figure 6:
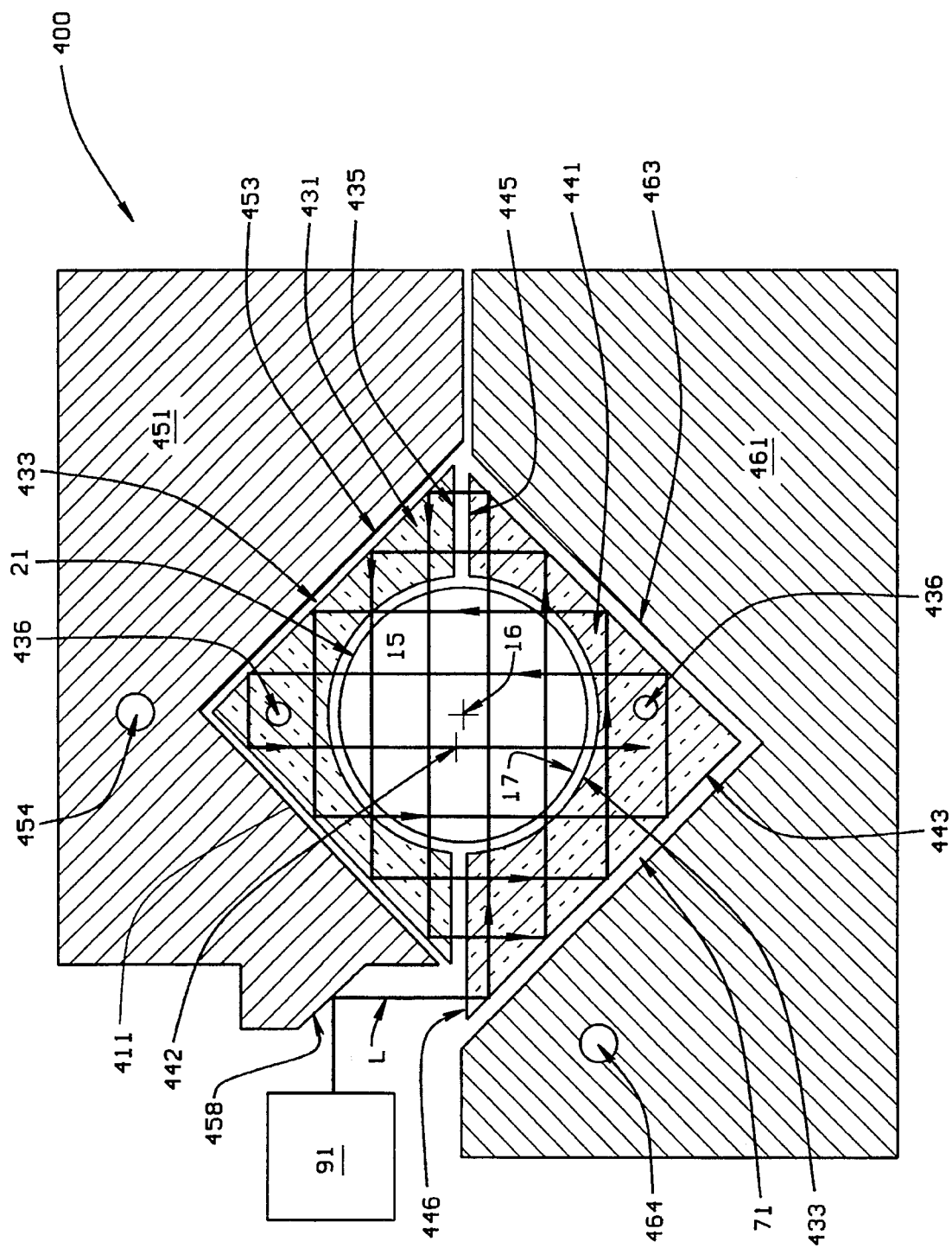
FIG. 6 is a cross-sectional view of a fifth embodiment of a laser pump cavity of the present invention using flat reflective surfaces with conductive cooling of the laser element.

FIG. 6 shows a fifth embodiment of a laser pump 400. The pump 400 defines a pump cavity 411 and has a conductively cooled laser element 15 and nonarcuate or planar reflective surfaces 443 and 433 or 463 and 453 housed in the cavity 411. The axis or center of the laser element 15 is indicated by 16. The laser element 15 is supported in a pair of sleeves 441 and 431 which are transparent to light emitted by pump light source 91 which pumps laser element 15. As with sleeves 31 and 41, sleeves 431 and 441 may fluoresce. The outer surface 17 of laser element 15 is coated with a suitable elastomeric material 21 having a refractive index nominally matching the refractive index of the laser element 15. The material 21 may also have adhesive properties. The material 21 effectively brings the outer surface 17 of the laser element 15 into contact with the inner surfaces 433 and 443 of the pump cavity sleeves 431 and 441 so that heat and pump light may be efficiently transmitted through these interfaces. Material 21 also mates the flat contacting surfaces 435 and 445 of the transparent sleeves 431 and 441 so that the surfaces 435 and 445 will not affect the travel of the light L in the cavity.

The two pump cavity sleeves 431 and 441 are made of a material transparent to the pump light and are of high thermal conductivity. The sleeves may contain internal passages 436 for cooling fluids. The cooling fluids used would be also transparent to the pumping light and have an index of refraction nominally equal to the index of refraction of the sleeves. The sleeves 431 and 441 may be made to partially absorb light emitted by the laser element 15 so as to stifle parasitic oscillations and amplified spontaneous emission. The sleeves 431 and 441 may also fluoresce to improve the pumping efficiency of the laser device. If the sleeves fluoresce, the pump source 91 may pump only the sleeves or both the sleeves and the laser element.

The lower sleeve 441 has an inner surface 443 which is in heat transfer relationship with the outer surface 17 of the laser element 15 via material 21. The outer surface 443 of sleeve 441 or the surface 463 it contacts forms the lower portion of the reflective surface of the pump cavity. The upper sleeve 431 has an inner surface 433 which is in a heat transfer relationship with the outer surface 17 of the laser element 15. The outer surface 433 of sleeve 431 or the surface 453 it contacts form the upper portion of the reflective surface of the cavity.

Unlike the reflective surfaces of the embodiments shown in FIGS. 1–5, the reflective surfaces of pump 400 are planar. The upper and lower portions of the reflective surfaces are each made up of at least two planar surfaces which intersect at an angle and each have a vertical axis of symmetry. In FIG. 6, the reflective surfaces are each made of two planar surfaces which intersect at a 90° angle and the vertical axes of symmetry bisect the angles formed by the planar surfaces. Each section thus defines, in cross-section, one-half of a regular polygon. The vertical axis of the lower portion extends through point 442 and the vertical axis of the upper portion extends through point 16 (which is also the center of the laser element). As can be seen the two vertical axes are offset from each other. Although the upper and lower portions of the reflecting surface are shown to have two planar surfaces, more planar surfaces could be used.

The outer surfaces of the two sleeves 431 and 441 are similar in shape but different in size and mounted offset from each other so that the pump light may enter the cavity through the offset part of the upper surface of sleeve 441. The part of the surface that admits the pump light to the cavity is shown as 446. A mirror 458 may be used to direct the pump light from its source 91 into the pump cavity. Note that the laser element is mounted symmetrically to sleeve 431 but not symmetrically in sleeve 441.

The sleeves 431 and 441 may be mounted in larger sleeves 451 and 461, respectively. Sleeves 451 and 461 may contain internal passages 454 and 464, respectively, for cooling fluids. These cooling fluids need not be transparent to the pump light as no pump light reaches this part of the pump cavity. If the outer surfaces of the transparent sleeves 431 and 441 are not made reflective, the inner surfaces 453 and 463 of sleeves 451 and 461 may be used as the reflective surfaces of the pump cavity. In that case the polymeric material 71 used to contact the transparent sleeves 431 and 441 and the cooling/mounting sleeves 451 and 461 must be transparent to the pump light.

Because of the asymmetric mounting of the laser element 15 in the lower transparent sleeve 441, the cooling of the laser element 15 will be asymmetric. This cooling may be made less asymmetric by suitably placing the cooling channels 464 in the lower cooling sleeve 461. Thus the cooling of sleeve 461 may be made purposely asymmetric in order to reduce the asymmetry in the cooling of the laser element 15.

Figure 7:
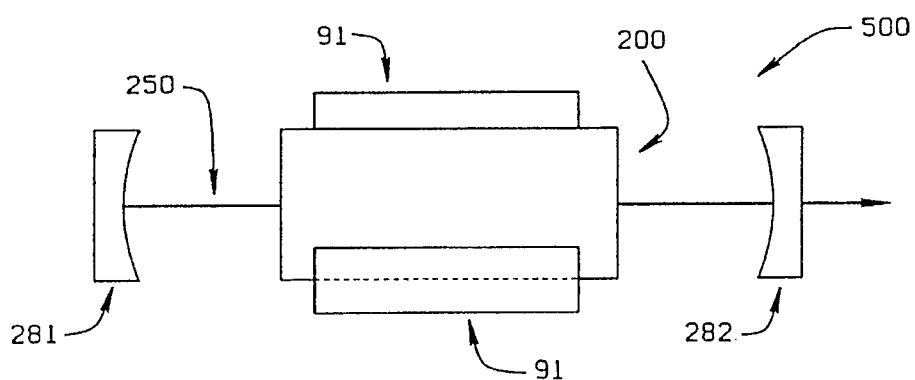
FIG. 7 is a diagrammatic representation of a laser of the present invention showing the relative positions of the pump cavity to the laser cavity mirrors.

FIG. 7 shows a laser 500 using the laser pump cavity 200 of FIG. 3. A laser requires reflecting surfaces placed to be generally perpendicular to the longitudinal axis of the laser element. In the laser 500, the laser pump 200, including pump sources 91 and laser element, is placed between two laser reflectors 281 and 282. The axis of the laser element and laser beam is shown as 250. These reflectors are placed on the extended axis of the laser element so as to retroreflect the laser beam. Generally one of the mirrors (e.g., mirror 281) is as highly reflecting as practicable while the other mirror (e.g., mirror 282) transmits a fraction of the laser beam emitted by the laser element. The beam transmitted through mirror 282 becomes the laser output beam. In some applications the mirrors 281 and 282 may be coated directly onto the laser element 15. This would produce a laser that could be small and compact. A wide variety of additional optical elements, including but not limited to, spatial filters, Q-switches, polarizers, lenses or tuning elements may be placed within the laser cavity, between the two laser reflectors 281 and 282.

The laser pump cavities of FIGS. 1, 3, and 6 all include a two part outer sleeve, a two part inner sleeve which is supported in the two part outer sleeve, and the laser element which is supported in the two part inner sleeve. These may be assembled by coating the material 21 to the laser element and forming the inner sleeve about the coated laser element. The outer surface of the two part inner sleeve is then coated with the material 71 and placed in a first half of the two part outer sleeve. The second half of the two part outer sleeve is then placed over the two part inner sleeve to close up the pump cavity. The two parts of the outer sleeve are then secured together, as described above, to secure the two halves of the outer sleeve together to maintain the pump cavity in its assembled state. The laser element may be secured against rotation about its axis or against other movement during assembly of the laser pump.

If the outer surface of the two part inner sleeve is to be the reflective surface, it is preferably coated with its reflective coating (i.e. silvered) after it has been placed around the laser element. This allows for the material 21 between the laser element and the inner sleeve to be examined to ensure that it sets properly prior to silvering of the outer surface of the inner sleeve. It further reduces the amount of handling of silvered surfaces, which may mar the surface and thus potentially create gaps in the silver coating. If the inner surface of the outer sleeve is to be used as the reflective surface, it may be silvered at any time prior to placing the inner sleeve and laser element in the outer sleeve.

In the embodiments of FIGS. 2 and 5, in which the pump cavity does not include an inner sleeve, the pump cavity is preferably assembled by placing a first end cap over the pump housing, inserting the laser element into the pump cavity to be supported by the first end cap, and then applying the second end cap to close the pump cavity and support the laser element in the pump cavity.

As can be appreciated, the pump cavity of any of the embodiments is simple to disassemble to allow for removal and replacement of the laser element. With the embodiments of FIGS. 2 and 5, the laser element may be slid out of the pump cavity and a new laser element can be inserted in its stead. With respect to the embodiments of FIGS. 1, 3, and 6, the material 21, which was noted above to be pliable, is softened, for example by the application of heat or a solvent. This will allow for the laser element 15 to be withdrawn from inner sleeve. Any residual material 21 can be easily cleaned from the inner surfaces of the inner sleeve while it is still soft, as is known in the art, to prepare the pump cavity for a new laser element. The new or second laser element is then coated with the material 21 and inserted into the inner sleeve. The material 21 is then allowed to set, to securely position the laser element in the inner sleeve. Alternately, the pump cavity of FIGS. 1, 3, and 6 can be disassembled in reverse order from the assembly steps outlined above after the material 21 and 71 has been softened or melted. The laser element can be replaced with a new laser element, and the pump cavity can then be reassembled.

The present invention fulfills all of the objectives and advantages set forth above. It will be apparent to those skilled in the art, however, that various changes, modifications, and other uses and applications which do not depart from the spirit and scope of the invention are possible. All such variations and equivalents are deemed to be covered by the invention, which is limited only by the claims that follow. For example, although the respective surfaces of the transparent sleeves and the heat sinks are shown to be semi-circular in cross-section to define segments of 180°, they could define segments of other degrees. The outer sleeves could be made of more than two pieces to allow for the use of more than two pumps. If two or more outer sleeve segments are used, the segments need not necessarily define cross-sectional arcs of the same degree. The cooling fluid of FIG. 5 could be replaced with a unitary, one-piece transparent sleeve which would have the same properties as sleeves 51 and 61. The pumps are all shown to have outer cooling sleeves. One or more than two transparent sleeves may be employed. The length of the laser element and the pump cavity may be increased so that several laser diode bars may be placed end-to-end to uniformly pump longer laser elements. The separate pumping sources may have identical or different wavelengths of emission as determined by the requirements of the lasing element(s). These examples are merely illustrative.

What is claimed is:

1. A laser pump including a pump housing defining a pump cavity, a pump light source positioned with respect to said housing to emits a pump light into said cavity, a laser element mounted within the pump cavity and a reflective surface in said pump cavity; said reflective surface including at least a first section having a longitudinal axis and a second section having a longitudinal axis; said first section longitudinal axis being parallel to and off-set from said second section longitudinal axis; the pump light source directing the pump light towards one or both of said reflective surface and said laser element, the reflective surface reflecting the pump light through the laser element to create a symmetric deposition of pump light in the laser element.

2. The laser pump of claim 1 wherein the first section longitudinal axis and the second section longitudinal axis lie on the same diameter of the laser element.

3. The laser pump of claim 1 wherein the first section and the second section define an arc of a circle, said arc of the first section having a radius larger than the arc of the second section, the longitudinal axis of the second section being coaxial with an axis of the laser element.

4. The laser pump of claim 1 where in the first section and second section each comprise at least a first planar surface and a second planar surface, said first and second planar surfaces being angled with respect to each other, said first section having a first axis of symmetry and said second section having a second axis of symmetry, said first and second axes of symmetry being spaced from each other.

5. The laser pump of claim 1 including means for cooling the laser element, the cooling means partially absorbing the light emitted by the laser element.

6. The laser pump of claim 5 in which the cooling means fluoresces into some or all of the laser element pump bands to pump the laser element.

7. The laser pump of claim 6 wherein the pump source pumps one or both of the fluorescent material and the laser material.

8. The laser pump of claim 1 including means for cooling the laser element, and wherein the means for cooling the laser element includes a cooling fluid surrounding the laser element and circulating in the pump cavity, said reflective surface comprising an inner surface of said pump housing.

9. The laser pump of claim 1 including means for cooling the laser element and wherein the means for cooling the laser element includes a hollow sleeve which receives said laser element, said sleeve having an inner surface in heat transfer relationship with an outer surface of said laser element and an outer surface in heat transfer relationship with said pump housing, said sleeve being substantially transparent to the light which pumps said laser element, said reflective surface comprising of one of said sleeve outer surface and said housing inner surface.

10. The laser pump of claim 9 wherein the hollow sleeve is a one-piece unitary sleeve.

11. The laser pump of claim 9 wherein the hollow sleeve is made of two or more elongate segments.

12. The laser pump of claim 9 wherein the outer surface of the laser element is coated with a coating to fill any space between said laser element and said sleeve, said coating being generally transparent to said pump light, having a high thermal conductivity, and having a refractive index nominally equal to the refractive index of the laser element.

13. The laser pump of claim 12 wherein said coating comprises a settable material which secures said laser element in said sleeve inner when said material sets.

14. The device of claim 9 wherein the laser element comprises at least two axially aligned segments, said laser segments being received by said sleeve.

15. The laser pump of claim 9 wherein said sleeve includes an internal passage through which cooling fluid circulates.

16. The laser pump of claims 1 wherein said pump housing has a passage therein through which cooling fluid circulates.

17. The laser pump of claim 1 in which radially asymmetric cooling of the cooling sleeves is used to make the cooling of the laser element more symmetric.

18. The laser of claim 1 wherein said pump light source is mounted externally of said pump cavity, said pump housing defining an opening therein though which said pump light enters said pump cavity, said gap being closed by a surface transparent to said pump light.

19. The laser pump of claim 18 wherein said surface which closes said pump light entry gap is coated with an anti-reflective coating.

20. The laser pump of claim 1 wherein the pump housing is a unitary, one-piece housing.

21. The laser pump of claim 1 wherein the pump housing comprises two or more elongate sections.

22. The laser pump of claim 21 wherein said sleeve comprises at least two elongate parts, said elongate parts having generally flat abutting surfaces defining a gap therebetween; a material filling said gap, said material having an index of refraction nominally equal to the index of refraction of said sleeves such that said flat abutting surfaces do not interfere with the travel of light through said cavity.

23. The laser pump of claim 1 wherein the reflective surface reflects the pump light through the laser element to create a uniform deposition of pump light in the laser element.

24. A laser including a laser pump, the laser pump having a pump housing, the pump housing comprising an inner surface defining a laser pump cavity, and a reflective surface and a laser element contained within the cavity; the reflective surface being generally parallel to the laser element; the reflective surface including at least a first section and a second section; said first section defining an arc of a cylinder having a longitudinal axis and a radius; said second section defining an arc of a cylinder having a longitudinal axis and a radius; said first section longitudinal axis being parallel to and off-set from said second section longitudinal axis, the reflective surface reflecting the pump light through the laser element to create a symmetric deposition of pump light in the laser element.

25. The laser of claim 24 wherein the ratio of the radius of the first section to the radius of the second section is from about 3:1 to about 1:1.

26. The laser of claim 24 wherein said pump housing comprises at least two elongate portions.

27. The laser of claim 26 wherein said at least two pump housing portions are identical, said portions being offset from each other.

28. A laser pump including a pump light source and a pump housing, the pump housing having an inner surface defining a laser pump cavity, and a reflective surface and a laser element contained within the cavity; the reflective surface being generally parallel to the laser element, the reflective surface being generally arcuate and defining at least a first radius and a second radius, said first radius being smaller than said second radius, said first radius having a first origin and said second radius having a second origin, said first and second origins being off-set from each other, the reflective surface reflecting the pump light through the laser element to create a symmetric deposition of pump light in the laser element.

29. The laser pump of claim 28 wherein said reflective surface defines a spiral.

30. The laser pump of claim 28 wherein said housing is a unitary, one-piece housing, said reflective surface being a continuous uninterrupted surface.

31. The laser pump of claim 28 wherein the pump housing receives a sleeve, said sleeve supporting said laser element in said housing; said sleeve being a unitary, one-piece sleeve having a continuous, uninterrupted outer surface; said outer surface being highly reflective to said pump light and defining the reflective surface.

32. A modular laser pump including:

a housing defining a cavity and having an inner surface;

an inner sleeve received in the housing cavity, the inner sleeve having an inner surface and an outer surface and defining an elongate opening;

a laser element received in the elongate opening of the inner sleeve to be supported in the pump cavity;

a pump light which introduces light into the pump cavity to pump the laser element;

a reflective surface, the reflective surface comprising one of the inner surface of the housing and the outer surface of the inner sleeve, said reflective surface including at least a first section having a longitudinal axis and a second section having a longitudinal axis; said first section longitudinal axis being parallel to and off-set from said second section longitudinal axis; the reflective surface reflecting the pump light through the laser element to create a symmetric deposition of pump light in the laser element; and a settable material which is generally transparent to the pump light and which is positioned between an outer surface of said laser element and the inner surface of the inner sleeve to secure the laser element in position in the inner sleeve, the settable material being softenable to allow for the laser element to be removed from the pump cavity.

33. The modular laser pump of claim 32 wherein the settable material is a silicone which may be softened by the application of heat or a solvent.

34. The modular laser pump of claim 33 wherein the laser element can be slid out of the inner sleeve after the settable material has been softened.

35. The modular laser pump of claim 32 wherein the inner sleeve comprises at least a first portion and a second portion.

36. The modular laser pump of claim 32 wherein the housing comprises at least a lower portion and an upper portion, wherein the upper and lower portions are secured together to position the inner sleeve and laser element within the housing.

37. A method of removing and replacing a laser element of a modular laser pump, the laser pump including a housing defining a cavity and having an inner surface; a pump light which introduces light into the pump cavity; an inner sleeve received in the housing cavity, the inner sleeve having an inner surface and an outer surface and defining an elongate opening; the laser element being received in the elongate opening of the inner sleeve to be supported in the pump cavity; a coating which fills any space between the laser element and the inner sleeve, the coating being generally transparent to the pump light and softenable upon the application of heat or a solvent; a reflective surface about the laser element including at least a first section having a longitudinal axis and a second section having a longitudinal axis, said first section longitudinal axis being parallel to and off-set from said second section longitudinal axis; the reflective surface reflecting the pump light through the laser element to create a symmetric deposition of pump light in the laser element;

said method including applying heat or a solvent to said coating to melt said coating, sliding the laser element from the inner sleeve, and inserting a second laser element into the sleeve.

38. The method of claim 37 including a step of cleaning any remaining coating from the inner surface of the inner sleeve prior to the step of inserting the second laser element into the inner sleeve.

39. The method of claim 38 including a step of applying the coating material to the second laser element prior to inserting the second laser element into the inner sleeve.

* * * * *